(12) United States Patent
Fukuchi

(10) Patent No.: US 10,540,278 B2
(45) Date of Patent: *Jan. 21, 2020

(54) MEMORY SYSTEM AND METHOD OF CONTROLLING CACHE MEMORY

(71) Applicant: TOSHIBA MEMORY CORPORATION, Minato-ku (JP)

(72) Inventor: Naoya Fukuchi, Tokyo (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/928,857

(22) Filed: Mar. 22, 2018

(65) Prior Publication Data

US 2018/0210831 A1    Jul. 26, 2018

Related U.S. Application Data

(63) Continuation of application No. 14/840,601, filed on Aug. 31, 2015, now Pat. No. 9,959,206.

(60) Provisional application No. 62/163,632, filed on May 19, 2015.

(51) Int. Cl.
*G06F 12/00* (2006.01)
*G06F 12/0802* (2016.01)
*G06F 3/06* (2006.01)

(52) U.S. Cl.
CPC ........ *G06F 12/0802* (2013.01); *G06F 3/0611* (2013.01); *G06F 3/0656* (2013.01); *G06F 3/0661* (2013.01); *G06F 3/0685* (2013.01); *G06F 2212/1024* (2013.01); *G06F 2212/60* (2013.01)

(58) Field of Classification Search
None
See application file for complete search history.

(56) References Cited

U.S. PATENT DOCUMENTS

| 5,253,351 | A | 10/1993 | Yamamoto |
| 6,470,437 | B1 | 10/2002 | Lyon |
| 6,728,839 | B1* | 4/2004 | Marshall ............ G06F 12/0862 711/137 |
| 7,809,879 | B1 | 10/2010 | Asano et al. |
| 8,977,833 | B2 | 3/2015 | Kazui et al. |
| 2002/0056028 | A1 | 5/2002 | Chang |
| 2008/0104328 | A1 | 5/2008 | Yoshikawa et al. |
| 2012/0131278 | A1 | 5/2012 | Chang |
| 2012/0159050 | A1 | 6/2012 | Yano et al. |

(Continued)

FOREIGN PATENT DOCUMENTS

| JP | 2008-112403 | 5/2008 |
| JP | 2012-128646 | 7/2012 |

(Continued)

*Primary Examiner* — Ryan Bertram
*Assistant Examiner* — Trang K Ta
(74) *Attorney, Agent, or Firm* — Oblon, McClelland, Maier & Neustadt, L.L.P.

(57) ABSTRACT

According to one embodiment, a memory system includes first and second memories, and a controller configured to switch between first and second modes, search whether data of a logical address associated with a read command is stored in the first memory in the first mode, and read the data from the second memory without searching whether the data of the logical address associated with the read command is stored in the first memory in the second mode.

19 Claims, 11 Drawing Sheets

(56) References Cited

U.S. PATENT DOCUMENTS

| | | |
|---|---|---|
| 2013/0124799 A1 | 5/2013 | Hiniker-Roosa |
| 2013/0212319 A1 | 8/2013 | Hida et al. |
| 2013/0262765 A1* | 10/2013 | Tsutsui ................ G06F 12/0802 |
| | | 711/118 |
| 2013/0297894 A1 | 11/2013 | Cohen et al. |
| 2013/0311721 A1 | 11/2013 | Yoshihara |
| 2014/0281265 A1 | 9/2014 | Atkisson |

FOREIGN PATENT DOCUMENTS

| | | |
|---|---|---|
| JP | 2012-128815 | 7/2012 |
| JP | 2012-234363 | 11/2012 |

* cited by examiner

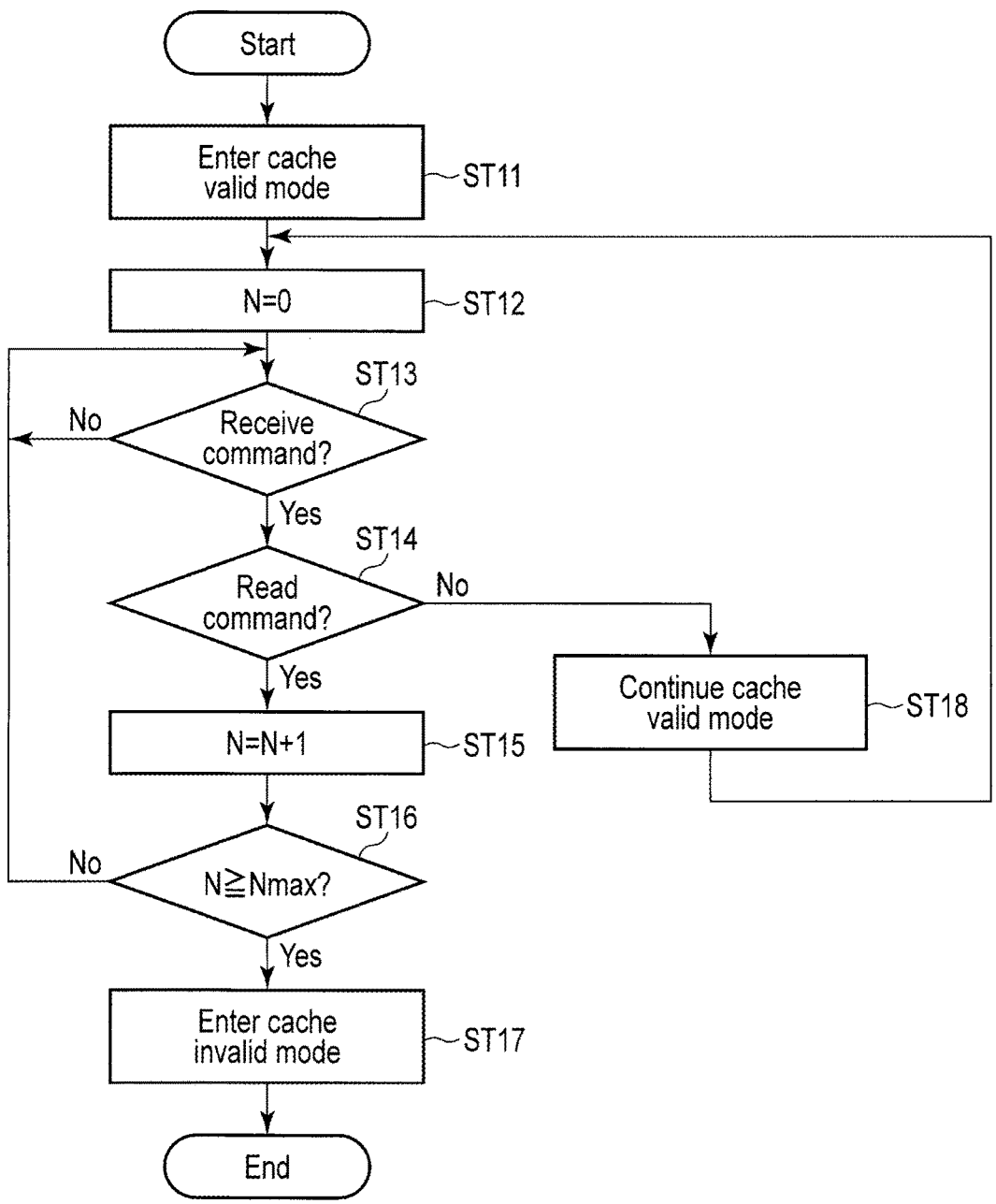
F I G. 4

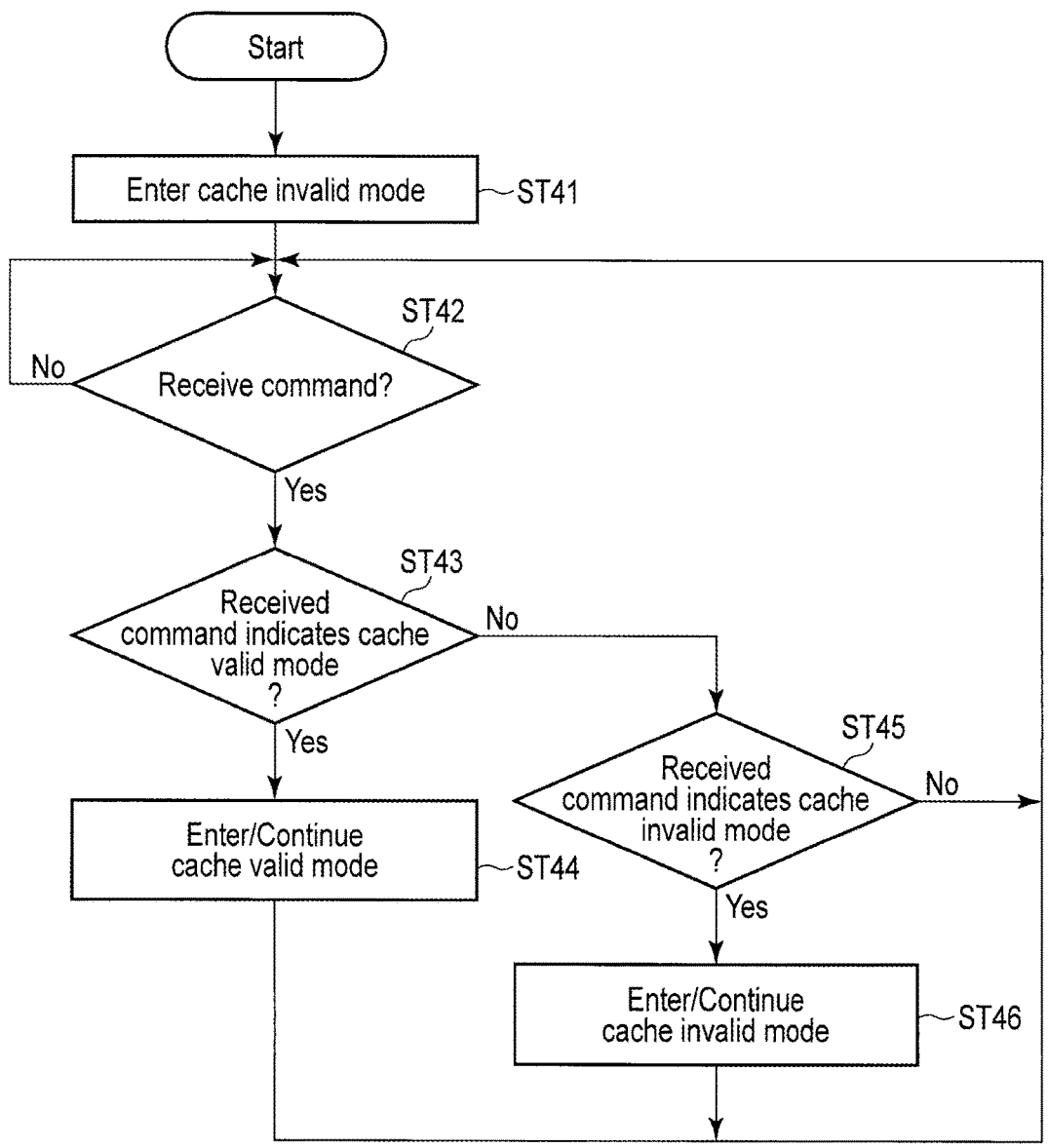
F I G. 7

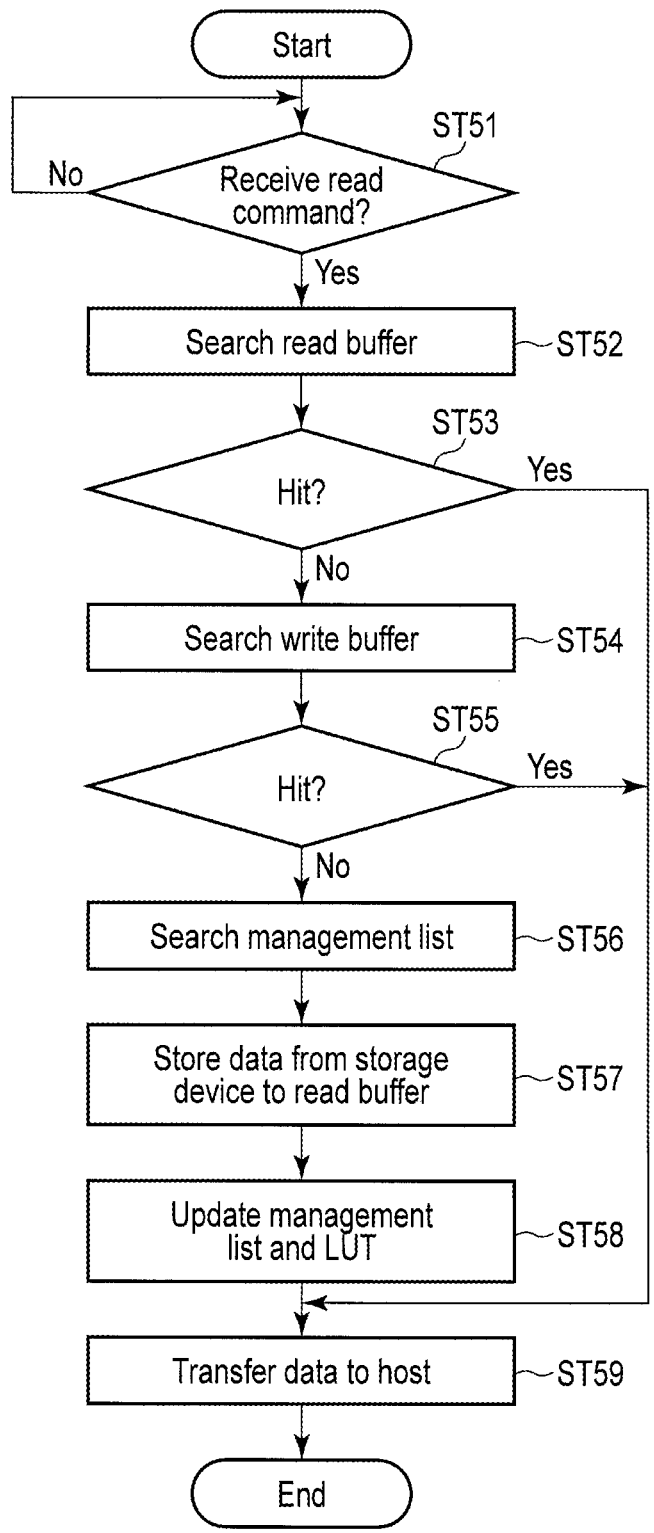
F I G. 8

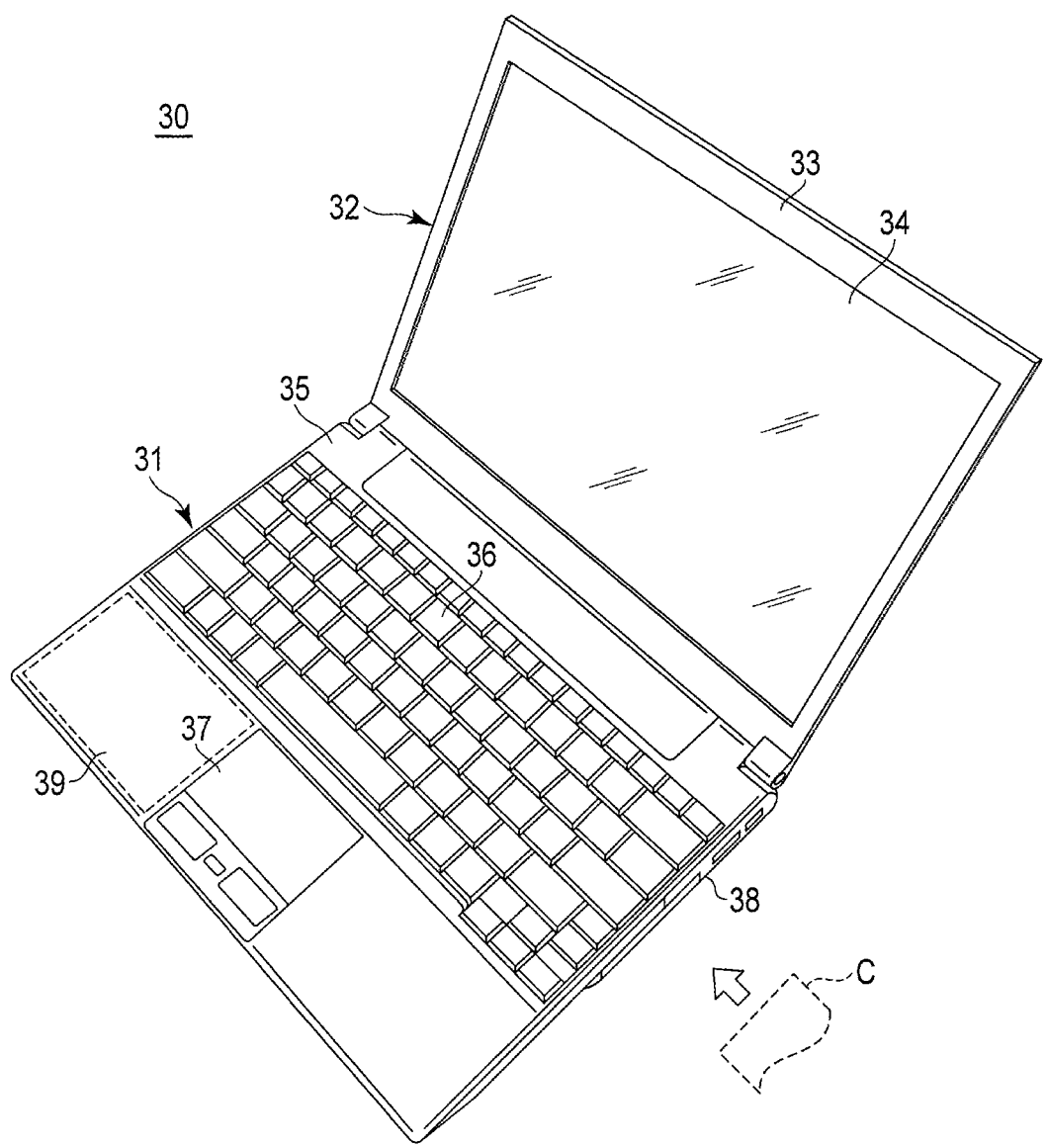
F I G. 9

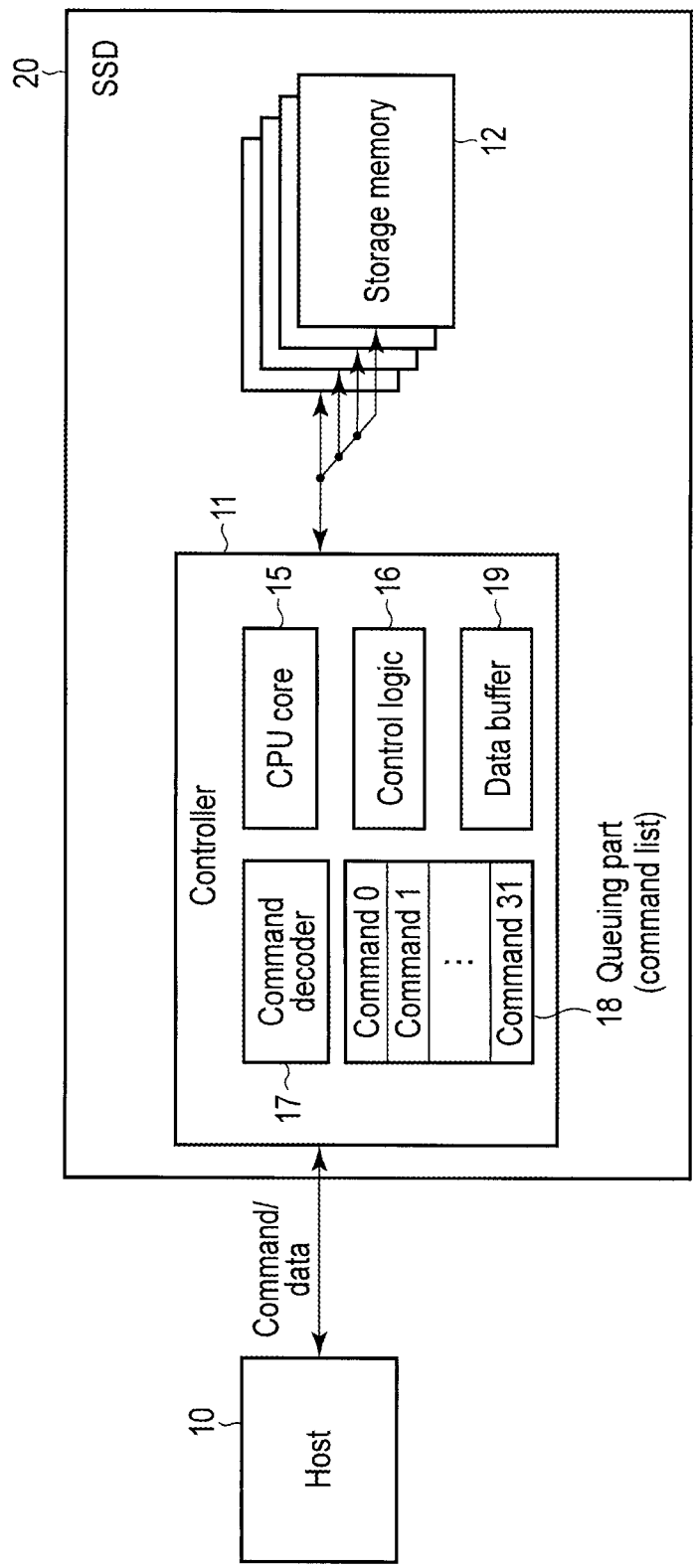
F I G. 11

MEMORY SYSTEM AND METHOD OF CONTROLLING CACHE MEMORY

CROSS-REFERENCE TO RELATED APPLICATIONS

This application is a continuation of U.S application Ser. No. 14/840,601, filed Aug. 31, 2015, and claims the benefit of U.S. Provisional Application No. 62/163,632, filed May 19, 2015, the entire contents of each of which are incorporated herein by reference.

FIELD

Embodiments described herein relate generally to a memory system and a method of controlling a cache memory.

BACKGROUND

A memory system comprising a cache memory and a nonvolatile storage memory is configured to transfer data read from the cache memory to a host without accessing a storage memory, when, for example, data which is a target of a read command from the host is present in the cache memory in order to expedite a response to the host.

BRIEF DESCRIPTION OF THE DRAWINGS

FIG. 4 is a flowchart showing a first method which controls the cache memory.

FIG. 7 is a flowchart showing a fourth method which controls the cache memory.

FIG. 8 is a flowchart showing a read algorithm in a cache valid mode.

FIG. 9 is a diagram showing an example of a portable computer.

FIG. 11 is a diagram showing an details of the storage device of FIG. 10.

DETAILED DESCRIPTION

In general, according to one embodiment, a memory system comprises: first and second memories; and a controller which is configured to switch between first and second modes, search whether data of a logical address associated with a read command is stored in the first memory in the first mode, and read the data from the second memory without searching whether the data of the logical address associated with the read command is stored in the first memory in the second mode.

1. Embodiments (1) Memory System

Figure 1:
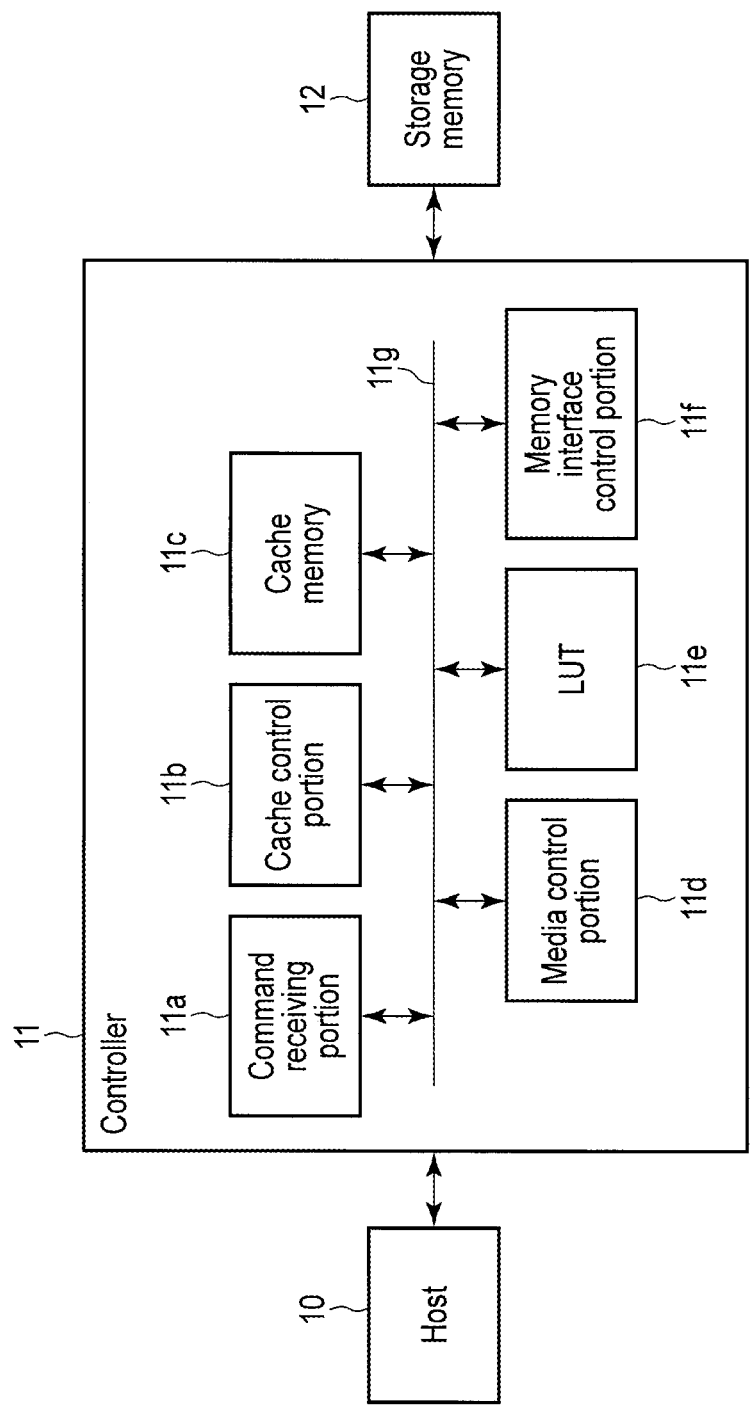
FIG. 1 is a diagram showing an example of a memory system comprising a cache memory.

FIG. 1 shows an example of the memory system comprising a cache memory.

The memory system comprises a host 10, a controller 11 controlled by the host 10 and a storage memory 12 whose read/write of data is controlled by the controller 11.

The controller 11 comprises a command receiving portion 11$a$, a cache control portion 11$b$, a cache memory 11$c$, a media control portion 11$d$, a look-up table (LUT) 11$e$, a memory interface control portion 11$f$ and a bus 11$g$ which connects these.

Note that the cache memory 11$c$ and LUT 11$e$ may be provided not in the controller 11, but outside the controller 11.

The command receiving portion 11$a$ is configured to receive a command from the host 10.

The cache control portion 11$b$ is configured to search, when the command from the host is a read command, whether data of the logical address associated with the read command is present in the cache memory 11$c$.

When the data of the logical address associated with a read command is present in the cache memory 11$c$, the cache control portion 11$b$ reads the data from the cache memory 11$c$ and transfers the data to the host 10.

Further, when the data of the logical address associated with a read command is not present in the cache memory 11$c$, the cache control portion 11$b$ reads the data from the storage memory 12 and transfers the data to the host 10.

Figure 3:
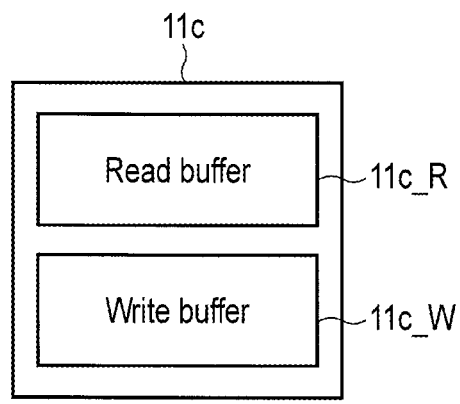
FIG. 3 is a diagram showing an example of the cache memory.

The cache memory 11$c$ comprises, as shown in, for example, FIG. 3, a read buffer 11$c$_R configured to temporarily memorize the data read from the storage memory 12, and a write buffer 11$c$_W configured to temporarily memorize the data to be written from the host 10 to the storage memory 12.

When the data requested by the host demands is read from the storage memory 12, the data is cached in read buffer 11$c$_R.

Further, the data stored in write buffer 11$c$_W is actually written to the storage memory 12 at a predetermined timing. After the data stored in write buffer 11$c$_W is transferred to the storage memory 12 and is written to the storage memory 12, the data in write buffer 11$c$ W is erased.

The cache control portion 11$b$ searches, when the command from the host is a read command, whether or not the data of the logical address associated with the read command is present in write buffer 11$c$_W, and whether or not it is present in read buffer 11$c$_R of the cache memory 11$c$.

That is, an algorithm which always determines whether the data of the logical address associated with a read command is present in the cache memory 11$c$ is adopted.

For example, even if the data corresponding to sequential logical addresses are not present in the cache memory 11$c$, the above-described algorithm is executed. This means that even if required data is not present in the cache memory 11$c$, access to the storage memory 12 must be executed after executing the above-described algorithm.

Here, the cache control portion 11$b$ is configured to have a function of switching validity/invalidity. The switching of validity/invalidity of the cache memory 11$c$ may be performed on an instruction from the host 10, or may be autonomously performed by the cache control portion 11$b$. In the case of the latter, when predetermined conditions are fulfilled, the cache control portion 11$b$ performs switching of validity/invalidity of the cache memory 11$c$.

The conditions for switching of validity/invalidity the cache memory 11$c$ are the controller (device) 11 has its function and the host 10 is set to be able to switch the validity/invalidity of the cache memory 11c.

The switching of the validity/invalidity of the cache memory 11c may be performed only once, or twice or more. In the case of the former, the valid state of or the invalid state of the cache memory 11c is maintained at all times after switching validity/invalidity of the cache memory 11c.

Here, the cache memory 11c being valid means that the function of temporarily storing read/write data of the cache memory 11c is in operation, or in the state where data can be transferred to the host 10 from the cache memory 11c.

Conversely, the cache memory 11c being invalid means that the function of temporarily storing read/write data of the cache memory 11c is not in operation, or in the state where data cannot be transferred to the host 10 from the cache memory 11c.

When the cache memory 11c comprises, as shown in, for example, FIG. 3, the read buffer 11c_R and the write buffer 11c_W, it is desirable that the cache control portion 11b control the validity/invalidity of the read buffer 11c_R and the validity/invalidity of the write buffer 11c_W, independently.

Figure 2:
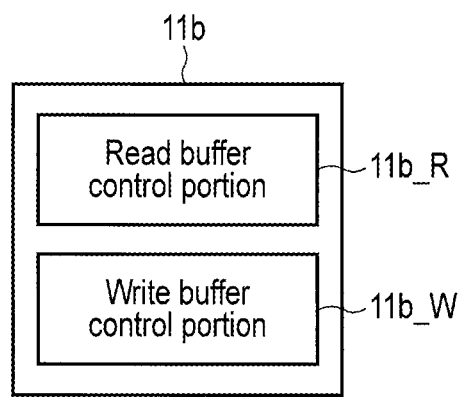
FIG. 2 is a diagram showing an example of a cache control portion.

For example, as shown in FIG. 2, the cache control portion 11b may comprise a read buffer control portion 11b_R configured to control the validity/invalidity of the read buffer 11c_R, and a write buffer control portion 11b_W configured to control the validity/invalidity of the write buffer 11c_W.

The cache memory 11c comprises volatile memory units such as a dynamic random access memory (DRAM) and a static random access memory (SRAM), etc. The cache memory 11c may be a nonvolatile memory such as a magnetic random access memory (MRAM), a resistive random access memory (ReRAM) or the like.

The media control portion 11d comprises a management list configured to manage the data stored in the storage memory 12.

The management list is a list, for example, which manages whether the data stored at a physical address of the storage memory 12 is valid or invalid data, or whether or not a block in the storage memory 12 is a free block (, to which data can be written). For example, the management list comprises a list of physical addresses in which valid data is stored.

The LUT 11e is a table which associates a logical address from the host 10, and a physical address of the storage memory 12 with each other. The association of a logical address and a physical address is performed by referring to the management list.

The memory interface controller 11f is configured to control the reading/writing of data from/to the storage memory 12. The storage memory 12 is a nonvolatile memory such as a NAND flash memory.

(2) How to Control Cache Memory

How to control validity/invalidity of the cache memory in the memory system shown in FIGS. 1 to 3 will now be described.

FIG. 4 shows the first method which controls the cache memory.

The first method is an example in which the validity/invalidity of cache memory is switched autonomously by the cache control portion in the controller. That is, when it is expected that the probability that the data requested by a host is present in the cache memory is low (the cache-hit ratio is low), the cache function of the controller is invalidated.

Here, an example will now be described, in which when the read command is issued repeatedly a predetermined number of times Nmax, the cache-hit ratio is determined to become low and thus the cache function is invalidated.

First, for example, when the memory system is in a starting state, the system enters a cache valid mode in which a cache function operates effectively (step ST11). Further, the number of times N that the read command is successively issued is set to 0 (step ST12).

After that, when a command is issued from the host and the controller receives the command, the cache control portion in the controller checks whether or not the command is a read command (steps ST13 to ST14).

When the command issued by the host is a read command, the cache control portion increments the value of the number of times N that the read command is successively issued (step ST15), by one. Further, the cache control portion determines whether the number of times N that the read command is successively issued has reached the predetermined number of times Nmax. Here, Nmax is a natural number of 2 or greater (step ST16).

When the number of times N that the read command is successively issued reaches the predetermined number of times Nmax, the cache control portion switches the cache valid mode to the cache invalid mode in which the caching function is invalidated (step ST17).

When entering the cache invalid mode, for example, the data in the cache memory is cleared (erased). At this time, the power supply to the cache memory may be shut off.

Further, when the cache memory functions as a read buffer and a write buffer, one or both of the read buffer and the write buffer may be invalidated in the cache invalid mode.

When the cache memory functions as a write buffer and transitions to the cache invalid mode, the data in the write buffer is written to a storage device (for example, a NAND flash memory).

In the cache invalid mode, it suffices if an algorithm which determines whether the data of the logical address associated with the read command is present in the cache memory is not adopted. Therefore, in the cache invalid mode, the cache memory may be operated merely as a data buffer.

When entering the cache invalid mode, the data of the logical address associated with the read command is read directly from the storage memory without searching the cache memory.

Conversely, when a command is issued from a host and the command is one other than the read command, the cache control portion continues the cache valid mode and resets the number of times that the read command is successively issued to 0 (steps ST14 to ST18 to ST12).

Note that in the cache invalid mode, for example, when a command other than the read command is issued, the operation returns to the cache valid mode.

As described above, according to the first method, when it is expected that the cache-hit ratio becomes low, the controller autonomously invalidates the cache function, thereby making it possible to improve the read performance.

Further, in the cache invalid mode, the cache memory is invalidated, and therefore it is not necessary to carry out processing of moving data to the storage memory from the cache memory when the power is turned off accidentally. Furthermore, when the cache memory is a write buffer, the command for writing write data temporarily stored in the write buffer actually to the storage memory is not necessary.

Figure 5:
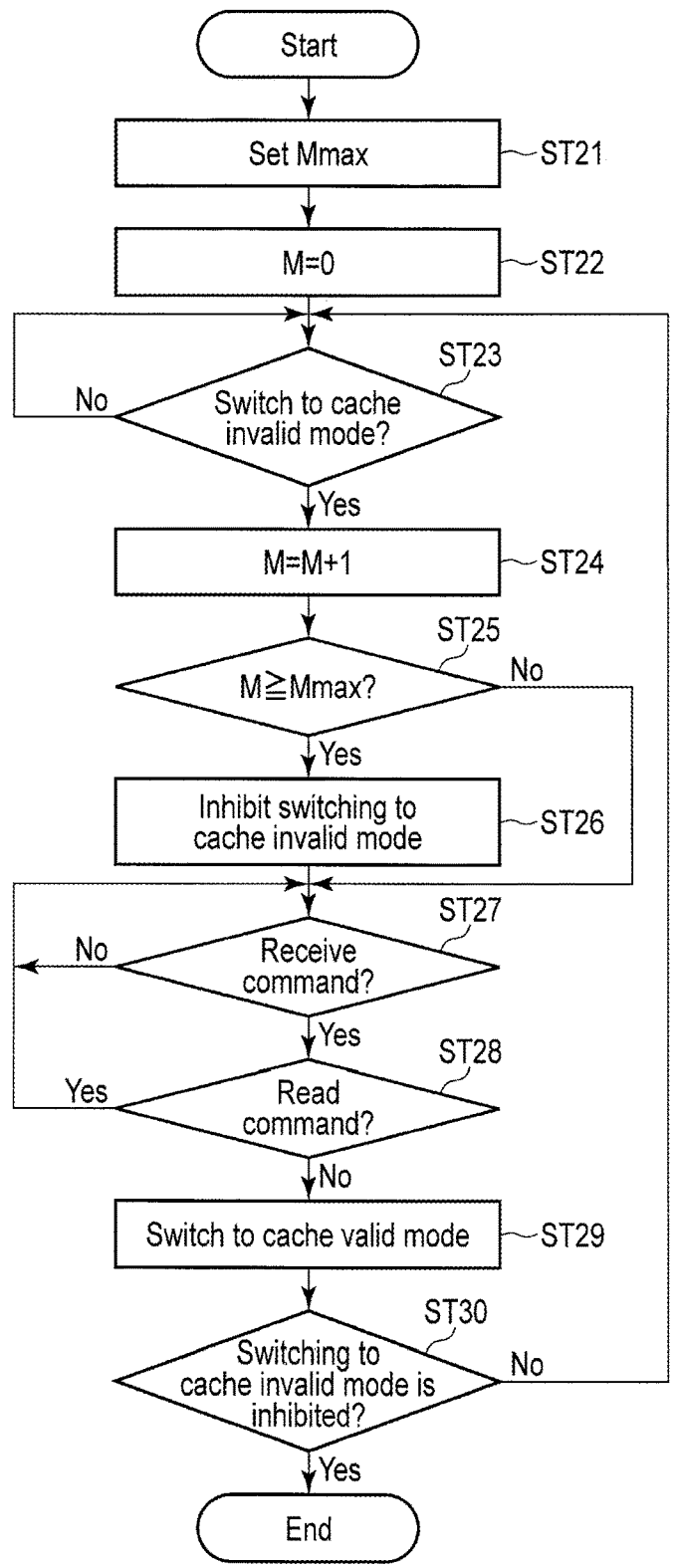
FIG. 5 is a flowchart showing a second method which controls the cache memory.

FIG. 5 shows the second method of controlling the cache memory.

The second method is an example in which the cache control portion in the controller can set the number of times that the cache memory can be invalidated.

First, for example, when the memory system is in a starting state, the number of times Mmax that the cache memory can be invalidated is set. Mmax is a natural number of 1 or lager (step ST21).

Mmax is set by, for example, an instruction from the host. When Mmax is 1, for example, the flow of FIG. 4 is carried out only once. Further, when Mmax is 2 or greater, for example, the flow of FIG. 4 is carried out twice or more repeatedly.

Further, the number of times M that the cache memory is invalidated (that is, the number of times of switching to the cache invalid mode) is set to an initial value 0 (step ST22).

After that, for example, when the read command is issued successively twice or more, thus switching to the cache invalid mode, the cache control portion increments the value M by one (steps ST23 to ST24).

Further, the cache control portion determines whether M has reached Mmax (step ST25).

When M has not reached Mmax, the cache control portion, thereafter, for example, confirms that a command other than the read command is issued, and then returns to the cache valid mode (steps ST27 to ST28 to 5T29). Then, on a condition that switching to the cache invalid mode is not inhibited, it is confirmed again whether the mode is switched to the cache invalid mode (steps ST30 to ST23).

When M has reached Mmax, the cache control portion, thereafter, inhibits switching to the cache invalid mode (step ST26).

When switching to the cache invalid mode is inhibited, the cache control portion, thereafter, for example, issues a command other than the read command. When the cache control portion returns to the cache valid mode, it executes the cache valid mode permanently (steps ST27 to ST28 to ST29 to ST30 to END).

As described above, according to the second method, the number of times that cache memory can be invalidated can be set by, for example, an instruction from the host.

Therefore, according to the device to which the memory system of this embodiment is applied, the number of times of switching valid/invalid of the cache function can be selected to improve the read performance.

Figure 6:
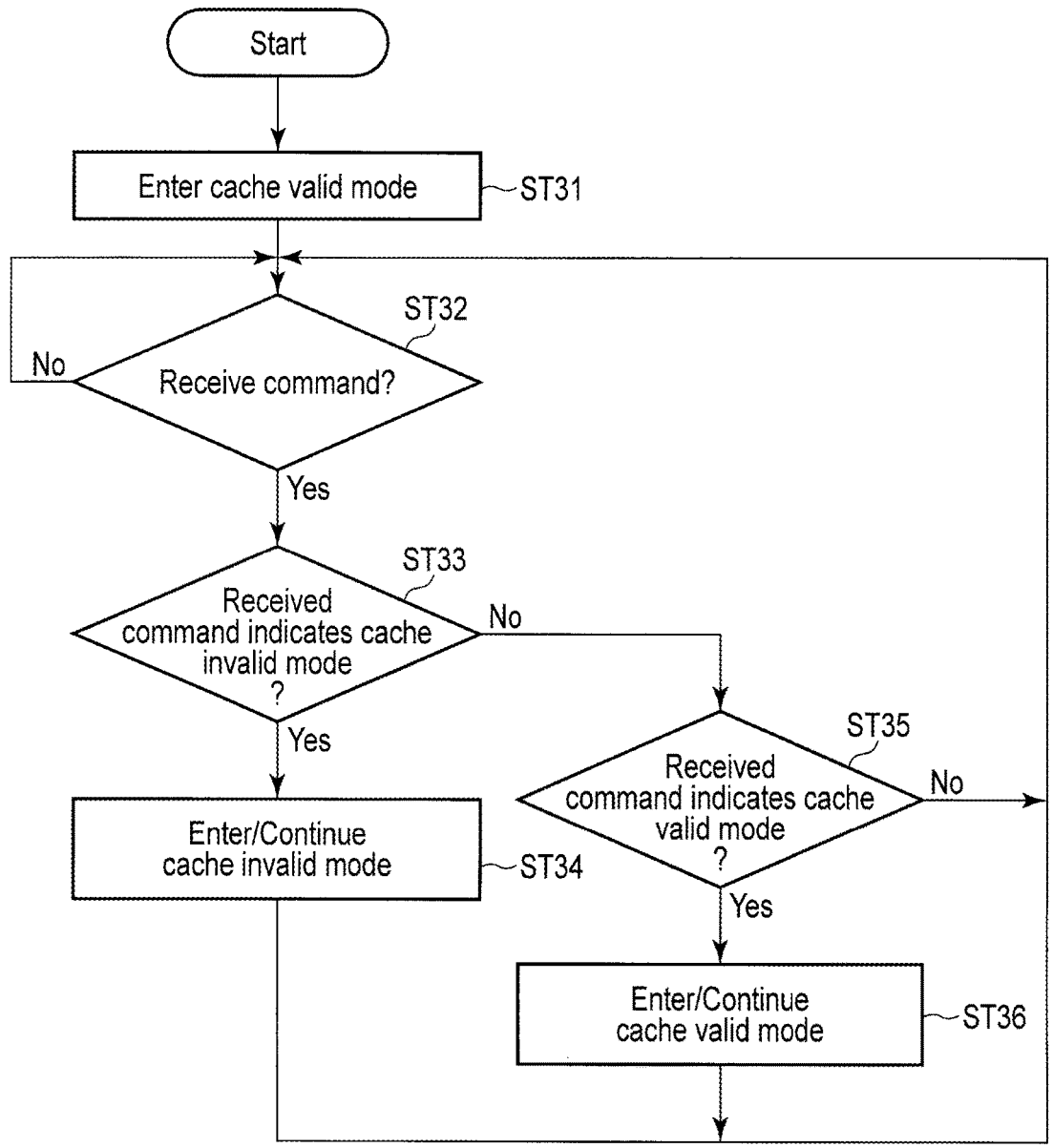
FIG. 6 is a flowchart showing a third method which controls the cache memory.

FIGS. 6 and 7 show the third and fourth methods of controlling the cache memory, respectively.

The third and fourth methods are examples in which the cache control portion in a controller switches validity/invalidity of the cache memory by an instruction from a host.

Further, the third and fourth methods are the examples in which the switching of valid/invalid of the cache memory can repeated twice or more.

Therefore, with the third and fourth methods, the host can switch validity/invalidity of the cache memory repeatedly during system startup on the bases of the past cache-hit ratio.

The third method (FIG. 6) is an example in which the cache valid mode functions as initial setting of the controller, and continues the cache valid mode or switches the cache valid mode to the cache invalid mode by an instruction from the host.

First, for example, if the memory system is set in a starting state, the process enters the cache valid mode where the cache function operates effectively (step ST31).

After that, when the command which indicates switching to the cache invalid mode is issued by the host and it is received by the controller, the cache control portion in the controller switches the cache valid mode to the cache invalid mode where the cache function is invalid (steps ST32 to ST33 to ST34).

When entering the cache invalid mode, the data of the logical address associated with a read command is read directly from the storage memory without searching the cache memory.

On the other hand, when the command which indicates switching to the cache valid mode is issued by the host and is received by the controller, the cache control portion in the controller switches the cache invalid mode to the cache valid mode, or continues the cache valid mode (steps ST32 to ST33 to ST35 to ST36).

In the cache valid mode, when the data of the logical address associated with a read command is present in the cache memory, it is read from the cache memory. Or if the data of the logical address associated with a read command is not present in the cache memory after searching the cache memory, the data is read from the storage memory.

The fourth method (FIG. 7) is an example in which the cache invalid mode functions as the initial setting of the controller, and continues the cache invalid mode or switches the cache invalid mode to the cache valid mode by an instruction from the host.

First, for example, if the memory system is set in a starting state, the procedure enters the cache invalid mode in which the cache function is invalid (step ST41).

After that, when the command which indicates switching to the cache valid mode is issued by the host and is received by the controller, the cache control portion in the controller switches the cache invalid mode to the cache valid mode in which the cache function operates effectively (steps ST42 to ST43 to ST44).

After entering the cache valid mode, the data of the logical address associated with a read command, if present in the cache memory, is read from the cache memory. Or, after searching the cache memory, if the data of the logical address associated with a read command is not present in the cache memory, the data read from the storage memory.

On the other hand, when the command which indicates switching to the cache invalidity mode is issued by the host and is received by the controller, the cache control portion in the controller switches the cache valid mode to the cache invalid mode, or continues the cache invalid mode (steps ST42 to ST43 to ST45 to ST46).

In the cache invalid mode, the data of the logical address associated with a read command is read directly from the storage memory without searching the cache memory.

As described above, according to the third and fourth methods, validity/invalidity of the cache function is switched autonomously by the host. That is, the host instructs the controller to switch the validity/invalidity of the cache function based on the past cache-hit ratio, thereby making it possible to improve the read performance.

FIG. 8 shows a read algorithm in the cache valid mode.

This example assumes that the cache memory functions as a read buffer and a write buffer.

First, when the controller receives a read command, the cache control portion in the controller searches whether the data of the logical address associated with the read command is stored in the read buffer (steps ST51 and ST52).

When the data of the logical address associated with a read command is stored in the read buffer, that is, when the data hits, the data is read from the read buffer and is transferred to the host (steps ST53 and ST59).

Next, when the data of the logical address associated with the read command is not stored in the read buffer, the cache control portion in the controller searches whether the data is stored in the write buffer (step ST54).

When the data of the logical address associated with the read command is stored in the write buffer, that is, when the data hits, the data is read from the write buffer and is transferred to the host (steps ST55 and ST59).

Here, the timing for executing searching of the read buffer (steps ST52 and ST53) and the timing for executing searching of the write buffer (steps ST54 and ST55) may be interchanged.

Next, when the data of the logical address associated with the read command is not stored in the write buffer, the cache control portion in the controller informs a media control portion that the data is read from the storage memory.

The media control portion determines LUT for converting the logical address associated with the read command into a physical address in the storage memory on the basis of a management list (step ST56). The media control portion converts the logical address into a physical address on the basis of the LUT, and transfers the physical address to the storage memory through the memory interface controller.

The media control portion controls the read buffer (cache memory) to store the read data from the storage memory (step ST57).

Further, the media control portion, after, if needed, updating the management list and LUT, transfers the read data to the host (steps ST58 and ST59).

Note that in the read algorithm in the cache invalid mode, it suffices if steps ST52 to ST55, which search the read buffer and the write buffer, are skipped and further step ST57, which caches data in a read buffer in the flowchart of, for example, FIG. 8 is skipped.

(3) To Summarize

As described above, according to the embodiments, when the probability that data requested by a host is present in a cache memory is expected to become low (the cache-hit ratio becomes small), the cache function of the controller is invalidated. In this way, the read performance can be improved.

In the first to fourth methods, the cache memory as an object subjected to switching between valid/invalid has the following possible cases, one in which it functions as only a read buffer, one in which it functions as only a write buffer, and one in which it functions as both a read buffer and a write buffer.

Further, in the third and fourth methods, in which valid/invalid can be switched twice or more by an instruction from a host, the type of cache memory as an object subjected to switching valid/invalid can be changed during system startup. The types of cache memory include the following possible cases: one in which it functions as only a read buffer, one in which it functions as only a write buffer, and one in which it functions as both a read buffer and a write buffer.

2. Examples of Application

The above-described examples are applicable to solid-state drive (SSD) memory systems.

If, in the controller firmware of an SSD memory system, the read command is issued a predetermined number of times consecutively (for example, Nmax in FIG. 4) from the host, the cache function in the controller is invalidated. In this way, the read performance of the SSD memory system can be improved.

An example of the computer system comprising an SSD memory system will now be described.

FIG. 9 shows a portable computer comprising an SSD memory system.

A portable computer 30 comprises a main body 31 and a display unit 32. The display unit 32 comprises a display housing 33 and a display device 34 accommodated in the display housing 33.

The main body 31 comprises a housing 35, a keyboard 36 and a touchpad 37, which is a pointing device. The housing 35 includes a main circuit board, an optical disk device (ODD) unit, a card slot 38, a data storage device 39, and the like.

The card slot 38 is provided in a side of the housing 35. The user can insert an additional device C to the card slot 38 from outside the housing 35.

The data storage device 39 is, for example, a solid state drive (SSD). The SSD may be used while being mounted inside of the portable computer 30 as a substitute for a hard disk drive (HDD), or may be used as the additional device C.

The data storage device 39 includes the controller described in the embodiments provided above.

Figure 10:
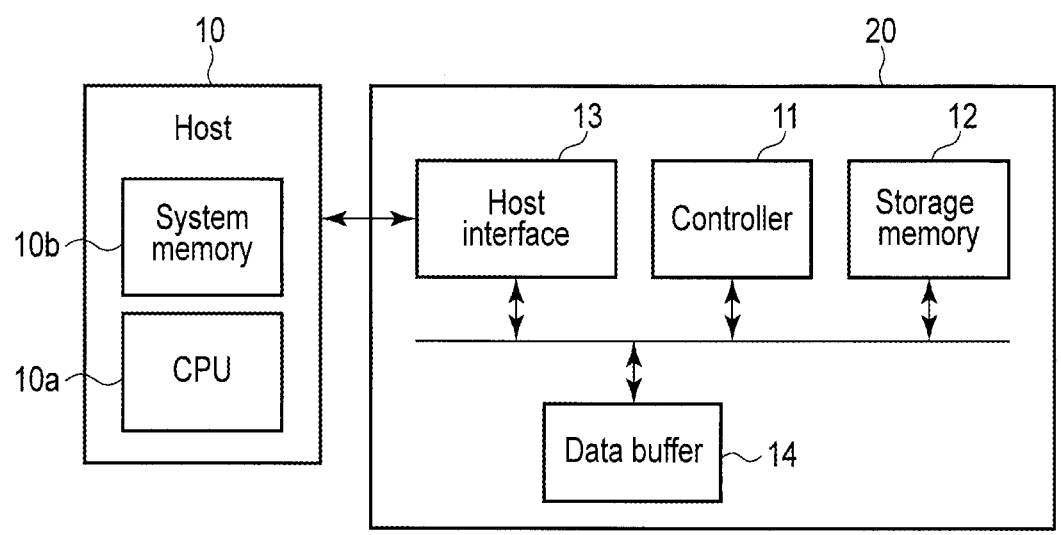
FIG. 10 is a diagram showing an example of a data storage device.

FIG. 10 shows an example of the data storage device.

A data storage device 20 is, for example, an SSD and comprises a controller 11, a storage memory 12, a host interface 13 and a data buffer 14.

The host interface 13 functions as an interface between the host 10 and the data storage device 20. The host 10 comprises a CPU 10a and a system memory 10b.

The storage memory 12 is, for example, a NAND flash memory. The data buffer 14 is, for example, a DRAM, SRAM, MRAM, ReRAM, or the like. That is, the data buffer 14 can be used as the cache memory 11c shown in FIG. 1. It suffices if the data buffer 14 is a random access memory more of a higher speed than that of the storage memory 12.

The controller 10 controls the read, write and erase of data with respect to the storage memory 12.

FIG. 11 shows details of the data storage device of FIG. 10.

In this figure, the same structural elements as those of FIG. 10 are designated by the same reference symbols.

The data storage device 20 comprises the controller 11 and the storage memory 12. The controller 11 comprises a CPU core 15, control logic 16, a command decoder 17, a queuing part (command list) 18 and a data buffer (buffer memory) 19.

Commands transferred from the host 10 are registered to the queuing part 18 in the controller through the command decoder 17. Further, the data associated with the commands are temporarily stored in the data buffer 19. The data buffer 19 is, for example, a SRAM. The commands registered in the queuing part 18 are processed sequentially on the basis of the tag number.

The command logic 16 is a logic circuit for executing, for example, processing instructed by the CPU core 15.

Note that the data buffer 19 may be located outside the controller 11. In this case, it suffices if the data buffer 14 of FIG. 10 is used in place of the data buffer 19 of FIG. 11.

Figure 12:
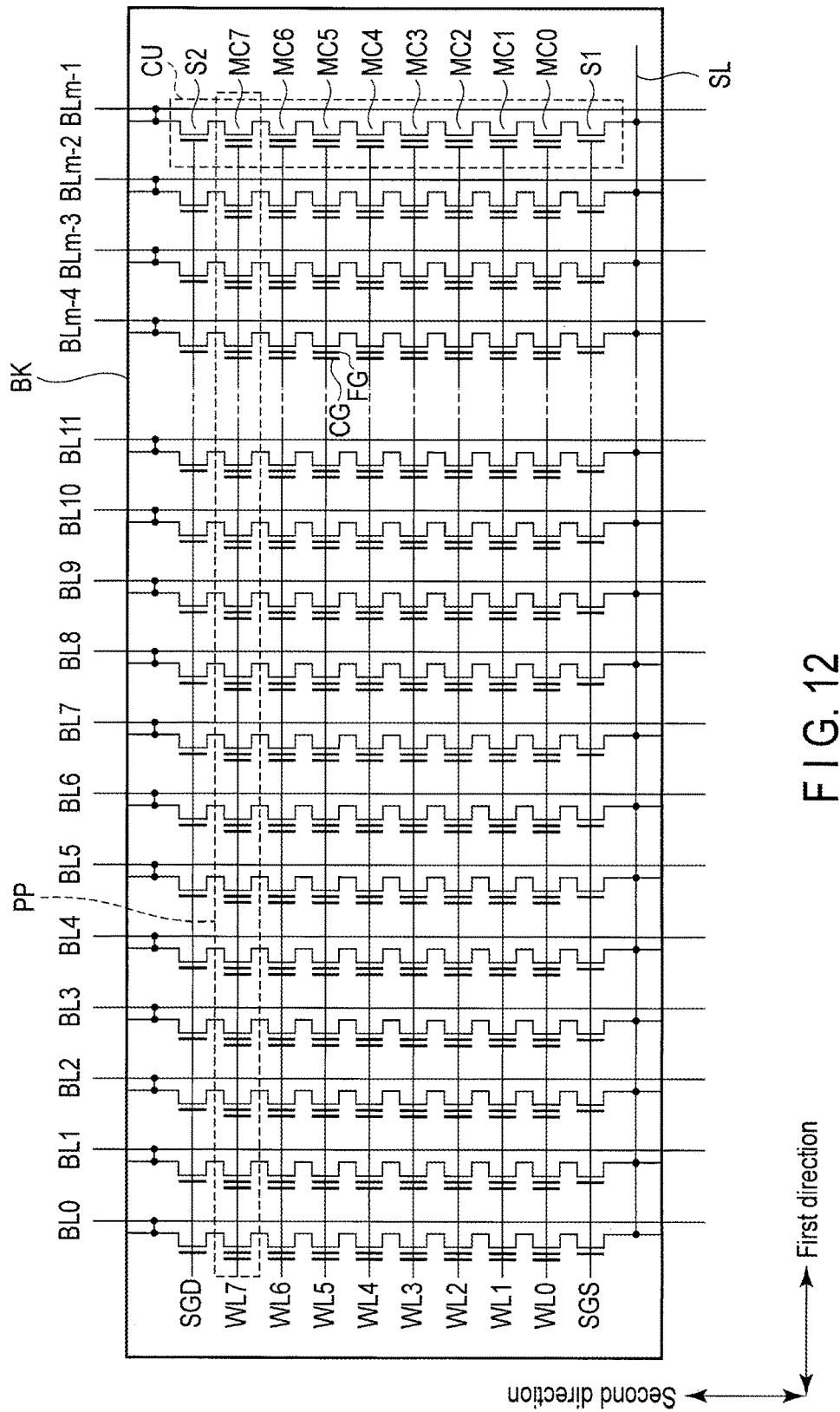
FIG. 12 is a diagram showing an example of a NAND flash memory.

FIG. 12 shows an example of the NAND flash memory.

The NAND flash memory is used as, for example, the storage memory 12 of FIG. 10 or 11.

The NAND flash memory includes a block BK.

The block BK comprises cell units CU arranged in a first direction. One cell unit CU comprises a memory cell string extending in a second direction which intersects the first direction, a transistor S1 connected to one end of a current path of the memory cell string and a selection transistor S2 connected to the other end of the current path of the memory cell string. The memory cell string comprises eight memory cells MC0 to MC7 whose current paths are connected in series.

One memory cell MCk (k is one of 0 to 7) comprises a charge storage layer (for example, a floating-gate electrode) FG and a control gate electrode CG.

In this example, one cell unit CU includes eight memory cells MC0 to MC7, but the embodiments are not limited to this structure. For example, one cell unit CU may comprise two or more memory cells, for example, 32 cells or 56 cells.

A source line SL is connected to one end of the current path of a memory cell string through the selection transistor S1. A bit line BLm-1 is connected to the other end of the current path of the memory cell string through the selection transistor S2.

Word lines WL0 to WL7 are connected common to the control gate electrodes CG of the memory cells MC0 to MC7 arranged in the first direction. Similarly, a selection gate line SGS is connected common to the gate electrodes of selection transistors S1 arranged in the first direction, and a selection gate line SGD is connected common to the gate electrodes of selection transistors S2 arranged in the first direction.

One physical page PP comprises m memory cells connected to one word line WLi (i is one of 0 to 7).

3. Conclusion

As described above, according to the embodiments, when the probability that data requested by a host is present in a cache memory is expected to become small (when the cache-hit ratio becomes small), the cache function of the controller is invalidated. In this way, the read performance can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a memory comprising a cache memory; and
a controller circuit configured to:
receive a read command from a host,
select one of a first mode or a second mode for processing of the received read command,
switch from the first mode to the second mode when a number of times that a plurality of the read commands that are sequentially received reaches a first number,
switch from the second mode to the first mode when a command other than the read command is received from the host, and
inhibit switching from the first mode to the second mode when the number of times that the switching from the first mode to the second mode reaches a second number;
the first mode being a cache valid mode for processing of reading data associated with the received read command with using the cache memory,
the second mode being a cache invalid mode for processing of reading data associated with the received read command without using the cache memory.

2. The memory system of claim 1, wherein:
the memory comprises a first memory as the cache memory and a second memory, and
the controller circuit is configured to:
read the data from the first memory in response to the read command when the data is stored in the first memory, and read the data from the second memory in response to the read command when the data is not stored in the first memory, in the first mode.

3. The memory system of claim 1, wherein:
the memory comprises a first memory as the cache memory and a second memory,
the first memory is provided in the controller circuit, and
the second memory is provided out of the controller circuit.

4. The memory system of claim 1, wherein:
the memory is provided out of the controller circuit.

5. The memory system of claim 1, wherein:
the memory comprises a first memory as the cache memory and a second memory, and
the first memory includes a read buffer which temporarily stores data read from the second memory.

6. The memory system of claim 1, wherein:
the memory comprises a first memory as the cache memory and a second memory, and
the first memory includes a write buffer which temporarily stores data to be written to the second memory.

7. The memory system of claim 6, wherein:
the controller circuit is configured to:
transfer data stored in the write buffer to the second memory when switching to the second mode.

8. The memory system of claim 1, wherein:
the controller circuit switches between the first and second modes based on an instruction from the host.

9. The memory system of claim 1, wherein:
the memory comprises a first memory as the cache memory and a second memory, and
the first memory is a volatile memory, and the second memory is a nonvolatile memory.

10. The memory system of claim 1, wherein:
the cache memory comprises a read buffer and a write buffer,
the read buffer is an object subjected to switching between the first mode and the second mode, and
the write buffer is not the object subjected to the switching between the first mode and the second mode.

11. The memory system of claim 1, wherein:
the cache memory comprises a read buffer and a write buffer,
the read buffer is not an object subjected to switching between the first mode and the second mode, and
the write buffer is the object subjected to the switching between the first mode and the second mode.

12. The memory system of claim 1, wherein:
the cache memory comprises a read buffer and a write buffer,
the read buffer and the write buffer are objects subjected to switching between the first mode and the second mode.

13. The memory system of claim 1, wherein:
the memory comprises a first memory as the cache memory and a second memory, and
the controller circuit in the first mode does not carry out processing of moving data from the first memory to the second memory when power of the memory system turns off accidentally.

14. A memory system comprising:
a first memory comprising a cache memory;
a second memory that stores data; and
a controller circuit configured to:
receive a read command from a host,
read data associated with the received read command from the second memory by processing without using the cache memory, after a number of times that a plurality of the read commands that are sequentially received reaches a first number,
read data associated with the received read command from the first memory or the second memory by processing with using the cache memory after a command other than the read command is received from the host, and
read data associated with the received read command from the first memory or the second memory by processing with using the cache memory after a number of times that switching from the processing with using the cache memory to the processing without using the cache memory reaches a second number.

15. The memory system of claim 14, wherein:
the controller circuit switches between the processing with using the cache memory and the processing without using the cache memory based on an instruction from the host.

16. A method of controlling a memory system that comprises a cache memory, the method comprising:
receiving a read command from a host;
selecting one of a first mode or a second mode for processing of the received read command;
switching from the first mode to the second mode when a number of times that a plurality of the read commands that are sequentially received reaches a first number;
switching from the second mode to the first mode when a command other than the read command is received from the host; and
inhibiting switching from the first mode to the second mode when the number of times that the switching from the first mode to the second mode reaches a second number;
the first mode being a cache valid mode for processing of reading data associated with the received read command with using the cache memory,
the second mode being a cache invalid mode for processing of reading data associated with the received read command without using the cache memory.

17. The method of claim 16, wherein:
the memory system further comprises a first memory as the cache memory and a second memory, and
the method further comprises:
reading the data from the first memory in response to the read command when the data is stored in the first memory; and
reading the data from the second memory in response to the read command when the data is not stored in the first memory, in the first mode.

18. The method of claim 16, wherein:
the cache memory comprises a read buffer and a write buffer,
the read buffer is an object subjected to switching between the first mode and the second mode, and
the write buffer is not the object subjected to the switching between the first mode and the second mode.

19. The method of claim 16, wherein:
the cache memory comprises a read buffer and a write buffer,
the read buffer is not an object subjected to switching between the first mode and the second mode, and
the write buffer is the object subjected to the switching between the first mode and the second mode.

* * * * *